United States Patent
Komoriya et al.

(10) Patent No.: US 8,271,772 B2
(45) Date of Patent: Sep. 18, 2012

(54) BOOT CONTROL METHOD OF COMPUTER SYSTEM

(75) Inventors: Norihiko Komoriya, Hadano (JP);
Hirofumi Fujita, Kawasaki (JP);
Morihide Nakaya, Hadano (JP);
Akihiro Umezawa, Hadano (JP);
Hideyuki Osakada, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 12/622,460

(22) Filed: Nov. 20, 2009

(65) Prior Publication Data
US 2010/0191948 A1    Jul. 29, 2010

(30) Foreign Application Priority Data
Jan. 23, 2009   (JP) .................. 2009-012484

(51) Int. Cl.
G06F 15/177   (2006.01)
G06F 9/00     (2006.01)
G06F 9/24     (2006.01)
G06F 11/00    (2006.01)
G06F 11/16    (2006.01)

(52) U.S. Cl. ............... 713/2; 713/1; 713/100; 714/4.11; 714/4.12

(58) Field of Classification Search .......... 713/1, 2, 713/100; 714/4.11, 4.12
See application file for complete search history.

(56) References Cited

U.S. PATENT DOCUMENTS

| | | | | |
|---|---|---|---|---|
| 6,609,213 B1 * | 8/2003 | Nguyen et al. | ............... | 714/4.12 |
| 7,472,313 B2 * | 12/2008 | Jiang et al. | ............... | 714/43 |
| 7,478,230 B2 * | 1/2009 | Mizoguchi | ............... | 713/1 |
| 7,739,543 B1 * | 6/2010 | Pittman et al. | ............... | 714/6.32 |
| 2009/0006635 A1 * | 1/2009 | Siegmund | ............... | 709/228 |
| 2009/0070441 A1 * | 3/2009 | Karlov et al. | ............... | 709/220 |

FOREIGN PATENT DOCUMENTS

| | | |
|---|---|---|
| JP | 2002-149599 A | 5/2002 |
| JP | 2007-94611 A | 4/2007 |
| JP | 2008-97276 A | 4/2008 |

* cited by examiner

*Primary Examiner* — Ji H Bae
(74) *Attorney, Agent, or Firm* — Mattingly & Malur, PC

(57) ABSTRACT

A computer system comprises two or more computers including at least one standby computer and a management computer which controls the computers. The management computer manages unique identification information which is assigned to an Ethernet controller of each computer. When a failure has occurred to an active computer, the management computer sets the unique identification information which has been assigned to the Ethernet controller of the failed computer to the Ethernet controller of the standby computer and the standby computer boots up a software image for the failed computer by use of the unique identification information which has been set to its Ethernet controller by the management computer.

6 Claims, 4 Drawing Sheets

BOOT CONTROL METHOD OF COMPUTER SYSTEM

INCORPORATION BY REFERENCE

The present application claims priority from Japanese application JP2009-012484 filed on Jan. 23, 2009, the content of which is hereby incorporated by reference into this application.

BACKGROUND OF THE INVENTION

The present invention relates to a boot control method to be used for a computer system having a redundant computer structure to boot up a computer via a storage area network (SAN) by use of a software image stored in a device adapted to the SCSI-protocol.

Fibre Channel has become a mainstream standard in recent years for the connection of storage devices in a storage area network (SAN). However, implementation of Fibre Channel connection requires construction of a new independent network even in an environment in which a LAN (Local Area Network) has already been constructed using Ethernet (registered trademark) cables. Further, costs for introducing interfaces for Fibre Channel (Host Bus Adapters) and Fibre Channel switches are extremely high compared to those for Ethernet.

Under such circumstances, SANs employing Gigabit Ethernet are recently attracting much attention. This connection method is extremely cost effective since Gigabit Ethernet has become widespread enough and many people have already purchased interfaces for Gigabit Ethernet (hereinafter referred to also as "Ethernet controllers") and constructed LAN environments. Software held in the Ethernet controller boots up an operating system stored in a storage device (iSCSI attached device) which is connected to the Ethernet controller via an Ethernet network.

In a computer system in which booting of a computer from a SAN environment, connected to the computer via a network, is implemented, data stored in logical units in a RAID device (in which operating systems of separate computers have been installed respectively) have to be protected. For this purpose, a RAID device is equipped with a security function that prohibits each computer from accessing a logical unit of the RAID device other than a corresponding logical unit in which the operating system for the computer has been installed. The security function generally employs unique identification information which has been assigned to a network port of each computer. Specifically, the logical unit in which the operating system for a computer has been installed is associated with the unique identification information assigned to the network port of the computer, and only the network port having the unique identification information is permitted to access the logical unit.

Thus, when a redundant structure, i.e. having an active computer and a standby computer, is employed for a computer system in which the booting of a computer is carried out using a software image via a network, the unique identification information assigned to the network port of the active computer differs from that assigned to the network port of the standby computer, and thus it is impossible to let the standby computer take over and directly use the software image including the operating system by switching the network connection from the active computer to the standby computer. In this case, settings of the security function on the RAID device's side have to be changed by means of SAN management software or manual operation. The technology mentioned above has been elaborated on in JP-A-2007-94611 and JP-A-2002-149599, for example.

SUMMARY OF THE INVENTION

As above, in the redundant structure of a computer system in which the booting of a computer is carried out via a storage area network (SAN) by use of a software image stored in a device adapted to the SCSI protocol, it is impossible to let the standby computer take over and directly use the software image in the event of the switching from the active computer to the standby computer by switching the network connection from the active computer to the standby computer since the unique identification information assigned to the Ethernet controller of the active computer differs from that assigned to the Ethernet controller of the standby computer.

In order to resolve the above problem, a computer system in accordance with the present invention employs a management computer having a software distributing function. Before the operating system of each active computer is started up, unique identification information management information is distributed from the management computer to each computer, by which the unique identification information assigned to the Ethernet controller of each active computer is read out and recorded in the management computer. In the event of the switching from an active computer to the standby computer, the unique identification information assigned to the Ethernet controller of the active computer, which has been recorded by the information management unit, is set to the Ethernet controller of the standby computer by the management computer before the operating system of the standby computer is started up, by which the standby computer is allowed to take over and directly use the software image of the active computer.

By the present invention, in the switching from an active computer to a standby computer in a computer system in which the redundant structure is employed and the booting is carried out via a storage area network (SAN) by use of a software image stored in a device adapted to the SCSI-protocol, the standby computer is allowed to automatically take over and use the software image of the active computer.

Other objects, features and advantages of the invention will become apparent from the following description of the embodiments of the invention taken in conjunction with accompanying drawings.

DETAILED DESCRIPTION OF THE EMBODIMENTS

Figure 1:
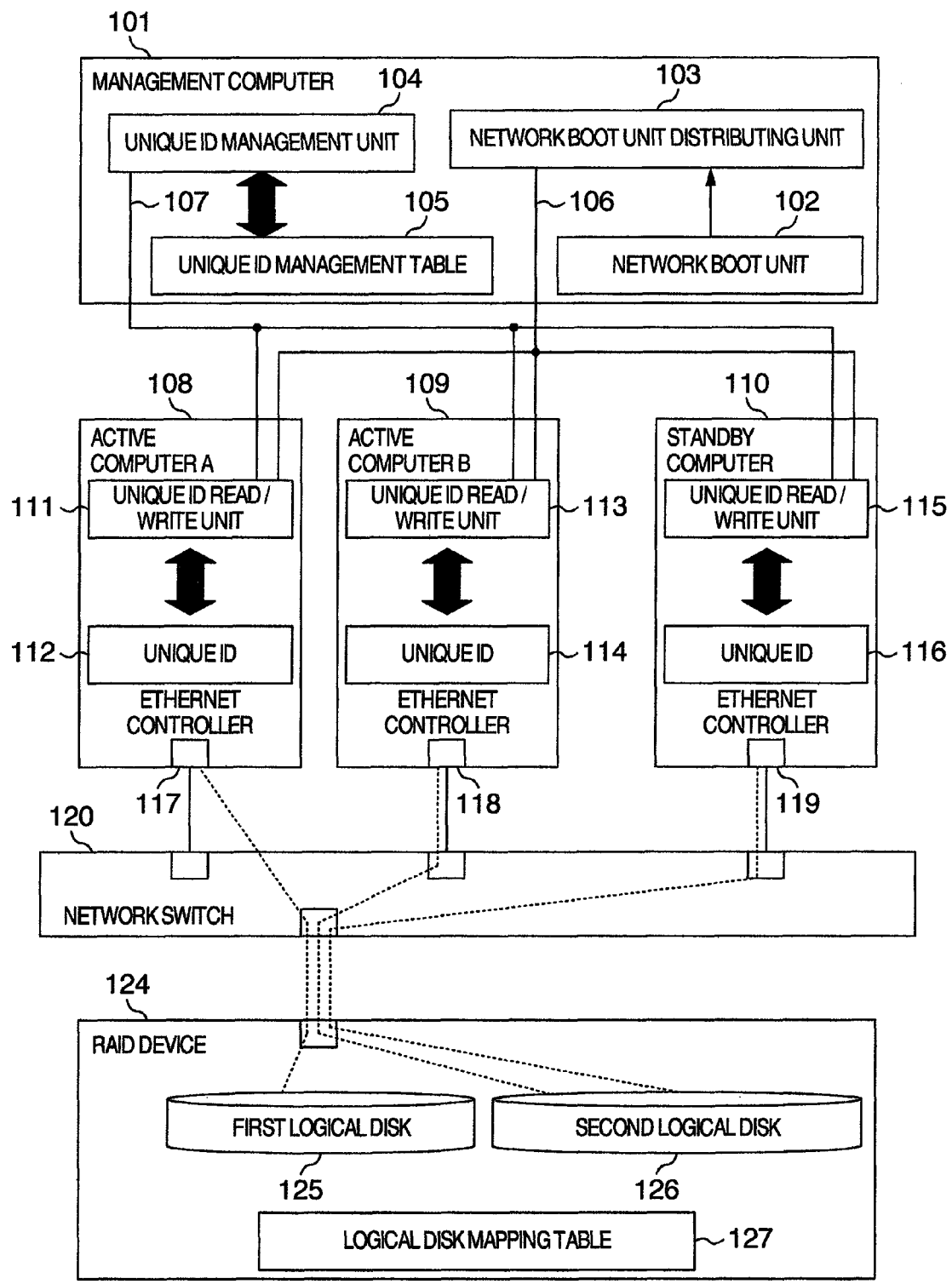
FIG. 1 is a schematic diagram showing a computer system in accordance with an embodiment of the present invention.

Referring now to the drawings, a description will be given in detail of a preferred embodiment in accordance with the present invention.

FIG. 1 is a schematic diagram showing a computer system in accordance with an embodiment of the present invention. The computer system includes a management computer 101, a first active computer A 108, a second active computer B 109, a standby computer 110, a network switch 120 and a RAID device 124. The management computer 101 is equipped with a unique identification information management unit 104 for managing unique identification information ("unique ID" in drawings) of each active/standby computer (108, 109, 110) and a network boot unit distributing unit 103 for distributing a network boot unit 102 to each active/standby computer (108, 109, 110). The management computer 101 has the function of starting or inhibiting the booting of each active/standby computer (108, 109, and 110) in the computer system.

Before startup of operating systems of the active/standby computers 108, 109 and 110, the management computer 101 distributes the network boot unit 102 to the active computers A 108 and B 109 via a communication path 106 by use of the network boot unit distributing unit 103. The communication path 106 in this case is a network in which communication according to TCP/IP (Transmission Control Protocol/Internet Protocol) is possible.

The network boot unit 102 distributed from the management computer 101 to the active computer A 108 executes a unique identification information read/write unit 111, by which unique identification information 112 is read out. The unique identification information can include an IP address and an initiator name of the Ethernet controller, an IP address and disk information on a logical disk (125, 126) of the RAID device 124, etc. The unique identification information 112 which has been read out is sent to the unique identification information management unit 104 of the management computer 101 via a communication path 107 and registered in a unique identification information management table 105 of the management computer 101. The communication path 107 in this case is a network in which communication according to TCP/IP is possible.

The standby computer 110 is a computer capable of taking over a process executed by an active computer (108 or 109) when the active computer has stopped. Each of the active/standby computers (108, 109, 110) is equipped with at least one Ethernet controller (117, 118, 119) having the unique identification information and thereby connected to the RAID device 124 via the network switch 120 in a network in which communication according to TCP/IP is possible. The RAID device 124 includes two disks, first logical disk 125 and second logical disk 126. The first and second logical disks 125 and 126 store operating systems that can be booted in the first and second active computers A 108 and B 109, respectively. The RAID device 124, which is an iSCSI attached device, is further equipped with a logical disk mapping table 127 which associates the unique identification information of each computer with a corresponding logical disk, by which the Ethernet controllers 117 and 118 of the active computers 108 and 109 are associated with the logical disks 125 and 126, respectively, in a one-to-one correspondence. By these functions, the active computer A 108 is prohibited from using the logical disk 126, which is not associated with the active computer A 108 in the logical disk mapping table 127, for example.

When the active computer B 109 stops its operation in the computer system having the above redundant structure, the management computer 101 distributes the network boot unit 102 to the standby computer 110 and executes the network boot unit 102 in the standby computer 110 before the operating system of the standby computer 110 starts up. Unique identification information 114 of the active computer B 109 registered in the unique identification information management table 105 is distributed to the standby computer 110 by use of the unique identification information management unit 104 of the management computer 101, and the contents of the unique identification information 114 are stored as unique identification information 116 of the standby computer 110. By this process, the standby computer 110 is allowed to connect to and use the logical disk 126, which is defined in the RAID device 124 as the logical disk for the active computer B 109, with no need of updating the settings of the RAID device 124 whatsoever.

Figure 2:
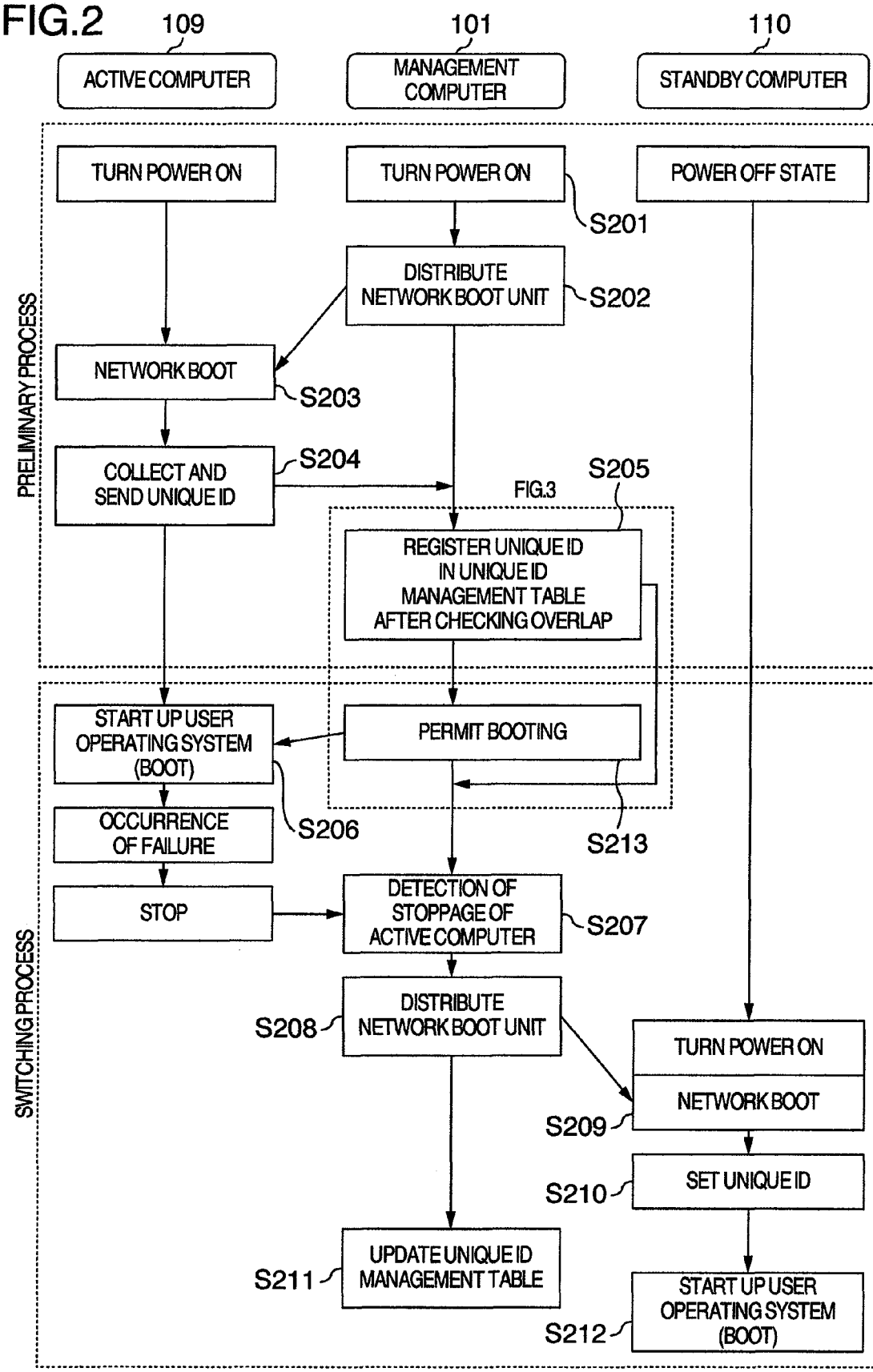
FIG. 2 is a schematic diagram showing the flow of switching from an active computer to a standby computer in the computer system of FIG. 1.

FIG. 2 is a schematic diagram showing the flow of the switching from the active computer B 109 to the standby computer 110 in the computer system of FIG. 1. For the switching process, steps S201-S205 shown in FIG. 2 have to be executed preliminarily. First, the power of the management computer 101 is turned ON (S201) and the network boot unit 102 is distributed by the management computer 101 (S202). Specifically, the distribution of the network boot unit 102 can be implemented by means of PXE (Preboot eXecution Environment) boot, for example. The active computer B 109 carries out the network boot by use of the network boot unit 102 distributed from the management computer 101 in S202 after its power has been turned ON (S203). Further, the active computer B 109 collects its unique identification information using a unique identification information read/write unit 113 and sends the collected information to the management computer 101 (S204). The management computer 101 registers the information received from the active computer B 109 in the unique identification information management table 105 after checking whether there exists overlap (duplication) between the received information and the information already held in the unique identification information management table 105 (S205). The startup of the operating system of the active computer B 109 is permitted when there exists no overlap in the check in S205 (S213). The above is the preliminary process necessary for the switching process. The step S205 will be explained in detail later referring to FIG. 3.

Next, the switching process will be explained. When a failure occurs in the active computer B 109 after its operating system has been started up (S206) and the active computer B 109 stops its operation, the management computer 101 detects the failure or stoppage of the active computer B 109 (S207) and distributes the network boot unit 102 to the standby computer 110 (S208). The standby computer 110 carries out the network boot (S209) according to the network boot unit 102 after turning ON its power and then sets its unique identification information 116 by executing a unique identification information read/write unit 115 (S210). In the step S210, the unique identification information read/write unit 115 sets the unique identification information 114 of the active computer B 109 delivered from the unique identification information management table 105 of the management computer 101 to the standby computer 110. Since the unique identification information 116 of the standby computer 110 has been updated, the management computer 101 updates the unique identification information management table 105 (S211). By the above process, the standby computer 110 is allowed to use the logical disk 126 which has been used by the active computer B 109 by use of the unique identification information of the active computer B 109 (S212).

Figure 3:
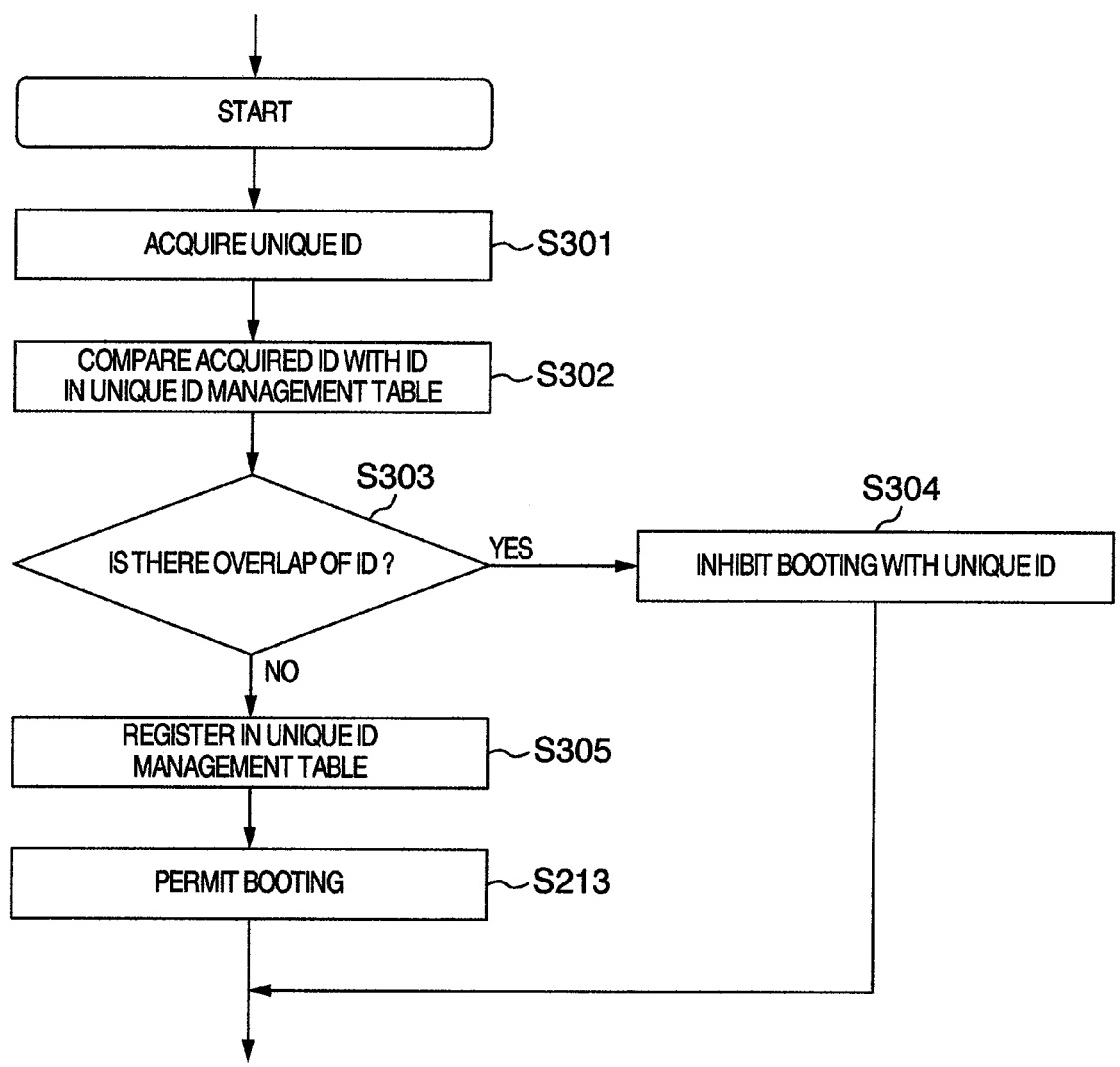
FIG. 3 is a flow chart showing the details of step S205 for checking whether there exists overlap in unique identification information (unique ID) in FIG. 2.

FIG. 3 is a flow chart showing the details of the step S205, "REGISTER IN UNIQUE ID MANAGEMENT TABLE AFTER CHECKING OVERLAP" in FIG. 2. The management computer 101 acquires the unique identification information of the active computer B 109 (S301), compares the acquired unique identification information to be newly registered in the unique identification information management table 105 with all the unique identification information already registered in the unique identification information management table 105 (S302) and thereby checks whether there exists overlap of the unique identification information (S303). If there exists no overlap (S303: NO), the management computer 101 registers the unique identification information of the active computer B 109 in the unique identification information management table 105 (S305) and permits the booting of the active computer B 109 (S213). On the other hand, if there exists overlap in S303 (S303: YES), the management computer 101 inhibits the booting of the active computer B 109 (S304).

Figure 4:
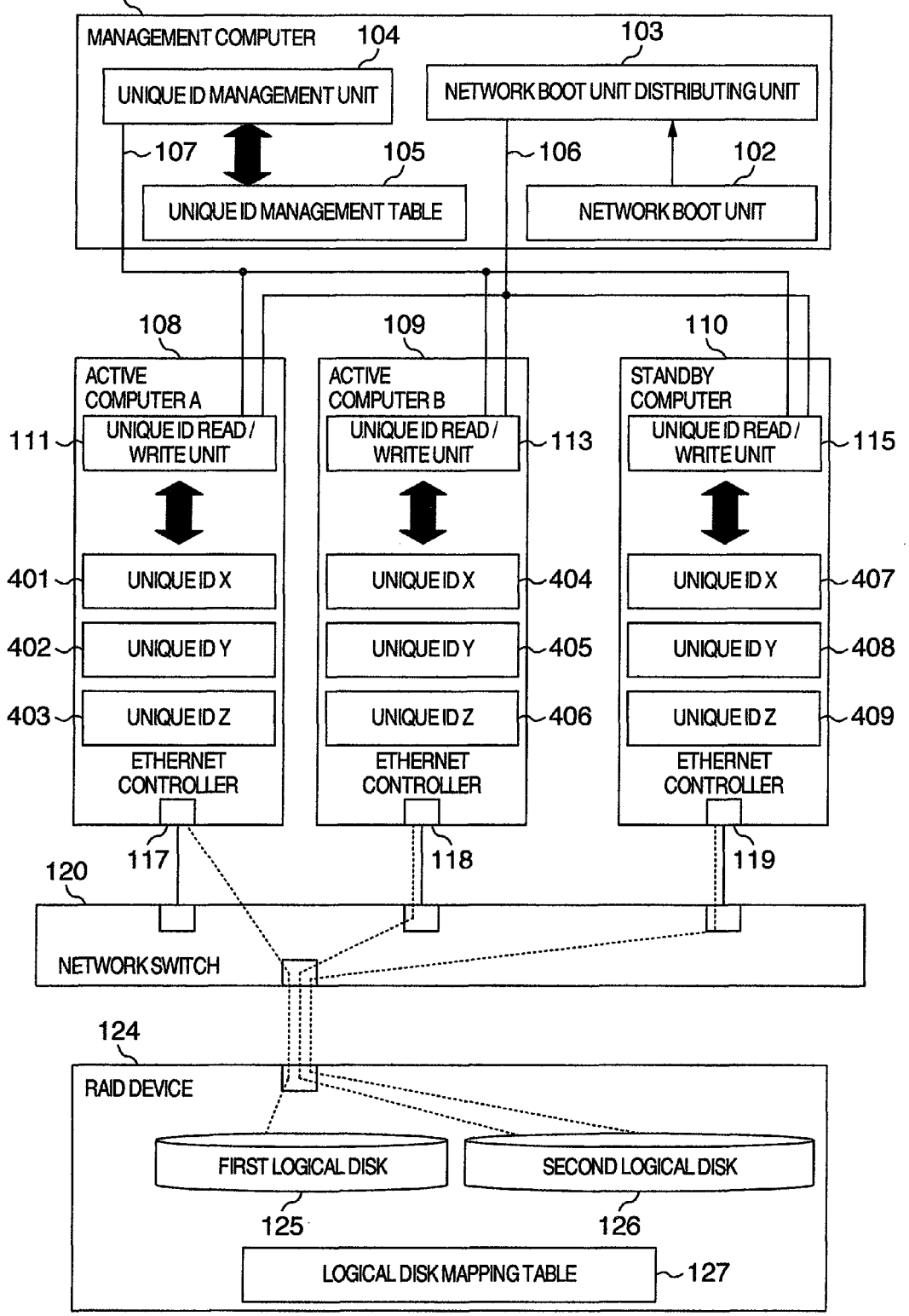
FIG. 4 is a schematic diagram showing a case where each active/standby computer in the computer system of FIG. 1 has the function of holding multiple sets of unique identification information.

FIG. 4 is a schematic diagram showing a case where each active/standby computer (108, 109, 110) in the computer system of FIG. 1 has the function of holding multiple sets of unique identification information. In the example of FIG. 4, the active computer A 108 holds three sets of unique identification information X401, Y402 and 2403. Similarly, the active computer B 109 holds unique identification information X404, Y405 and 2406, and the standby computer 110 holds unique identification information X407, Y408 and 2409. The three sets of unique identification information held by each active/standby computer (108, 109, 110) are the unique identification information of the active computer A 108, the unique identification information of the active computer B 109 and the unique identification information of the standby computer 110 which have been stored in advance. Specifically, the unique identification information collected by the active computer A 108 is copied and stored as the unique identification information X401, X404 and X407. Similarly, the unique identification information collected by the active computer B 109 is copied and stored as the unique identification information Y402, Y405 and Y408, and the unique identification information collected by the standby computer 110 is copied and stored as the unique identification information Z403, Z406 and 2409. The copying of the unique identification information is implemented by the unique identification information management unit 104 of the management computer 101.

Further, the management computer 101 enables selection of a set of unique identification information to be referred to by each active/standby computer (108, 109, 110) for the booting of the logical disk from the three sets of unique identification information held by the active/standby computer. Specifically, this can be implemented by use of the unique identification information management unit 104, by copying a set of unique identification information specified by the management computer 101 to the leading address of a memory area which is referred to for the unique identification information by the Ethernet controller of each active/standby computer (108, 109, 110).

The unique identification information of the active computer B 109 has been stored as the unique identification information Y408 held by the standby computer 110. When the active computer B 109 stops its operation due to a failure, the management computer 101 instructs the standby computer 110 to boot up by use of the unique identification information Y408, by which the standby computer 110 is allowed to take over and use the logical disk 126 which has been used by the active computer B 109.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A boot control method for a computer system which comprises two or more computers, including at least one standby computer, and a management computer for controlling the computers, wherein:
   each of the computers is equipped with an Ethernet controller and executes booting of a software image including an operating system of the computer by use of unique identification information, the unique identification information having been assigned to the Ethernet controller necessary for connecting a device adapted to a SCSI protocol to the computer via a network in which communication according to TCP/IP is possible, and
   the management computer manages the unique identification information assigned to the Ethernet controller of each computer, and
   when any failure has occurred to an active computer, the management computer sets the unique identification information which has been assigned to the Ethernet controller of the computer having the failure to the Ethernet controller of the standby computer and the standby computer boots up the software image for the computer having the failure by use of the unique identification information which has been set to its Ethernet controller by the management computer,
   wherein the management computer previously checks whether there exists overlap in the unique identification information being managed and inhibits the booting of a computer using overlapped unique identification information when overlap is found.

2. The boot control method according to claim 1, wherein the management computer distributes a network boot unit to each computer, and has the network boot unit executed in the computer to collect the unique identification information assigned to the Ethernet controller of the computer before the software image of the computer is booted up.

3. The boot control method according to claim 1, wherein:
   multiple sets of unique identification information are held in the standby computer, and
   the management computer can select a set of unique identification information to be used for the next booting of the standby computer from the multiple sets of unique identification information held in the standby computer.

4. A boot control method for a computer system which comprises two or more computers, including at least one standby computer, and a management computer for controlling the computers, wherein:
   each of the computers is equipped with an Ethernet controller and executes booting of a software image including an operating system of the computer by use of unique identification information, the unique identification information having been assigned to the Ethernet controller necessary for connecting a device adapted to a SCSI protocol to the computer via a network in which communication according to TCP/IP is possible, and
   the management computer manages the unique identification information assigned to the Ethernet controller of each computer, and
   when any failure has occurred to an active computer, the management computer sets the unique identification information which has been assigned to the Ethernet controller of the computer having the failure to the Ethernet controller of the standby computer and the standby computer boots up the software image for the computer having the failure by use of the unique identification information which has been set to its Ethernet controller by the management computer, wherein:

multiple sets of unique identification information are held in the standby computer, and the management computer can select a set of unique identification information to be used for the next booting of the standby computer from the multiple sets of unique identification information held in the standby computer.

5. The boot control method according to claim 4, wherein the management computer distributes a network boot unit to each computer, and has the network boot unit executed in the computer to collect the unique identification information assigned to the Ethernet controller of the computer before the software image of the computer is booted up.

6. A computer system comprising two or more computers including at least one standby computer;

a management computer which controls the computers; and a storage device, adapted to a SCSI protocol and connected to the computers via an Ethernet network, which stores a software image including an operating system of each computer, wherein:

each of the computers is equipped with an Ethernet controller and boots up the software image for the computer from the storage device by use of unique identification information which has been assigned to the Ethernet controller, and the management computer includes a management table to be used for managing the unique identification information assigned to the Ethernet controller of each computer, when a failure has occurred to an active computer, the management computer sets the unique identification information which has been assigned to the Ethernet controller of the computer having the failure to the Ethernet controller of the standby computer, and the standby computer boots up the software image for the computer having the failure by use of the unique identification information which has been set to its Ethernet controller by the management computer, each of the computers holds multiple sets of unique identification information, and the management computer selects a set of unique identification information which should be used by each computer for the booting of the software image from the multiple sets of unique identification information and instructs each computer to use the selected set of unique identification information.

* * * * *